(12) United States Patent
Johnson et al.

(10) Patent No.: US 6,614,570 B2
(45) Date of Patent: Sep. 2, 2003

(54) SHUTTER FOR FIBER OPTIC SYSTEMS

(75) Inventors: A. David Johnson, San Leandro, CA (US); David Hice, Morgan Hill, CA (US)

(73) Assignee: TiNi Alloy Company, San Leandro, CA (US)

( * ) Notice: Subject to any disclaimer, the term of this patent is extended or adjusted under 35 U.S.C. 154(b) by 0 days.

(21) Appl. No.: 09/968,740

(22) Filed: Sep. 29, 2001

(65) Prior Publication Data

US 2002/0071167 A1 Jun. 13, 2002

Related U.S. Application Data

(60) Provisional application No. 60/236,956, filed on Sep. 29, 2000.

(51) Int. Cl.[7] .............................................. G02B 26/02
(52) U.S. Cl. ...................... 359/230; 359/227; 359/231
(58) Field of Search ......................... 359/227, 230–231

(56) References Cited

U.S. PATENT DOCUMENTS 5,867,302 A * 2/1999 Fleming ...................... 359/291
6,470,108 B1 * 10/2002 Johnson ........................ 385/18

* cited by examiner

*Primary Examiner*—James Phan
(74) *Attorney, Agent, or Firm*—Richard E. Backus

(57) ABSTRACT

A light shutter for controlling a light signal between occluded and uninterrupted states. The shutter has a frame which mounts a beam under compression so that it assumes either of two bi-stable buckled positions. An occluder is mounted on the beam, A shape memory alloy actuator is provided which applies a force transverse on the beam as the actuator is heated to its shape change transition temperature. The transverse force bends the beam, causing it to buckle to the opposite bi-stable position. This moves the occluder into or out of the path of the light signal.

4 Claims, 2 Drawing Sheets

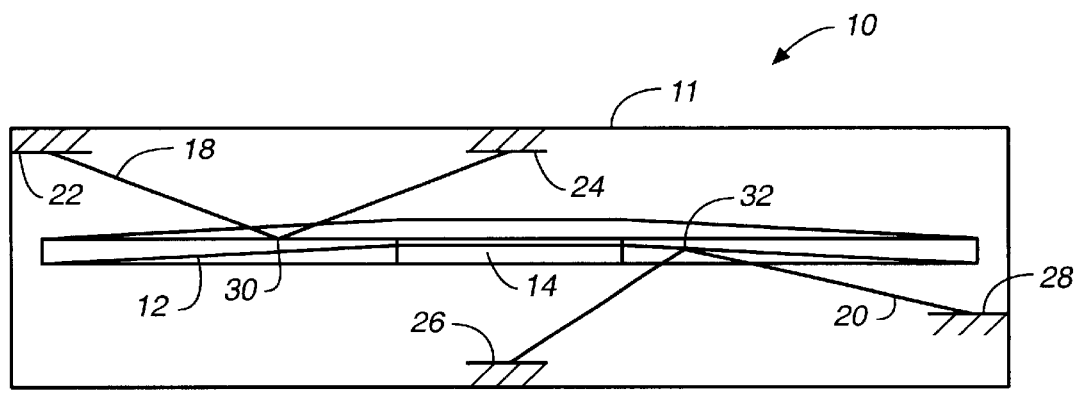
FIG._1
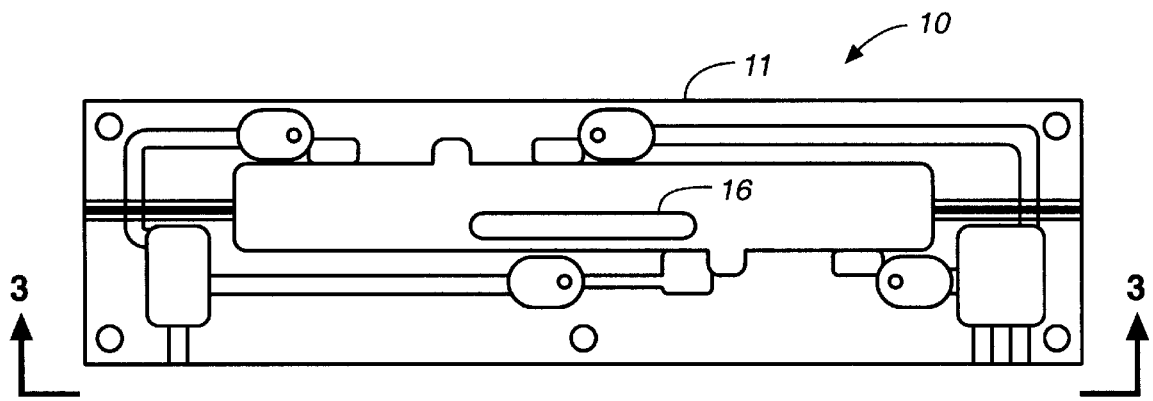
FIG._2
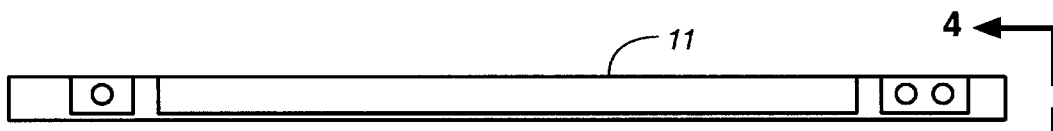
FIG._3
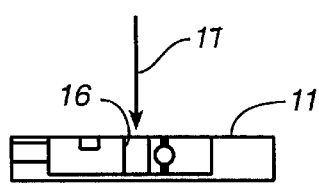
FIG._4

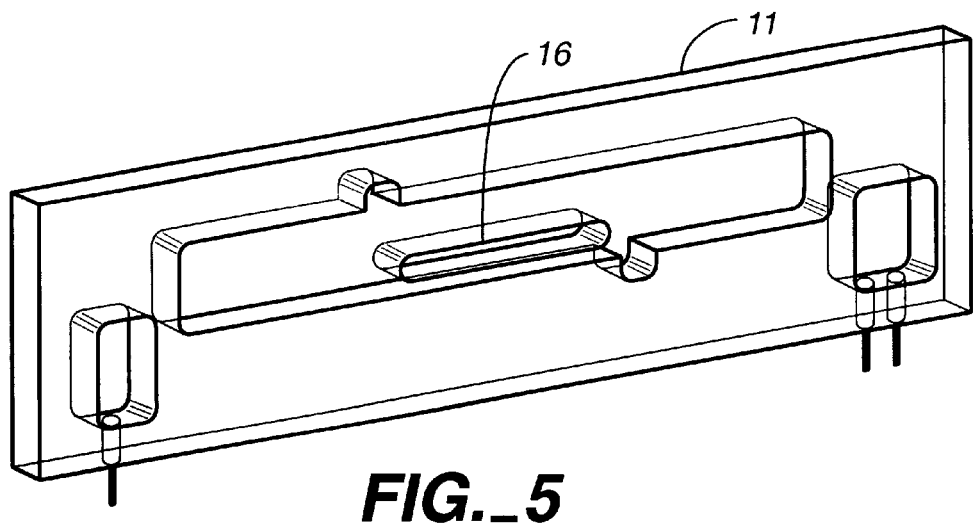
FIG._5
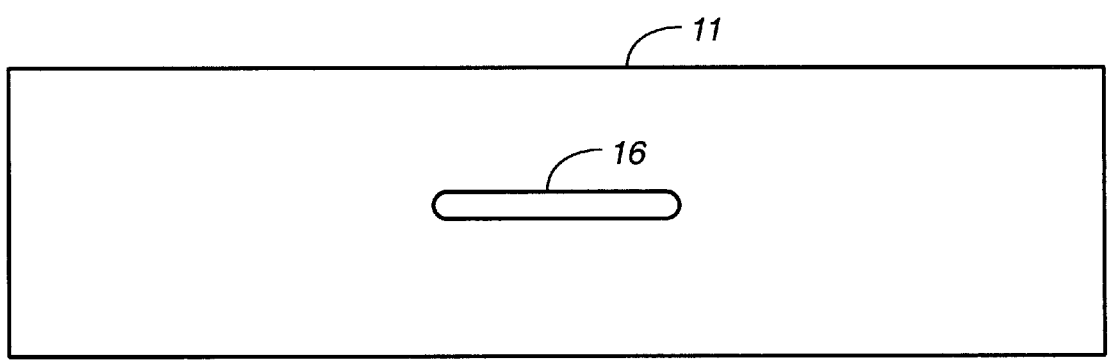
FIG._6

SHUTTER FOR FIBER OPTIC SYSTEMS

CROSS REFERENCE TO PRIOR APPLICATIONS

This application claims the benefit under 35 USC §119(e) of U.S. provisional application serial No. 60/236,956 filed Sep. 29, 2000.

BACKGROUND OF THE INVENTION

1. Field of the Invention

This invention relates in general to temporary interruption of optical light signals for testing and diagnostics of information-handling data transmission systems, especially fiber optic transmission equipment.

2. Description of the Related Art

The need for increased communications bandwidth is growing rapidly. Internet e-mail traffic volume is increasing exponentially as video, music, voice and image transmission are increasingly carried by internet protocol. The only available technology capable of meeting this demand is dense-wavelength-division-multiplexing (DWDM) fiber optics transmission. Optical network connections are described in layers: the physical layer comprising fiber and optical layers; a logical layer in which the point-to-point connections are established; and a virtual connection layer realized in digital electronics. Historically optical signals were converted to electronic information for switching (routing) in the logical layer, and re-converted to optical signals for re-transmission. Increasingly, switching is being accomplished by physical displacement of mirrors and lenses. AS DWDM becomes dominant it becomes economical to switch traffic by physically re-directing a beam of light rather than by conversion to electronic signals.

The increasing use of fiber optics, and concomitant emphasis on all-optical networks, has resulted in the development of a wide variety of optical switches. Most of these switches divert light beams by means of miniature moving mirrors. These switches range in size and complexity from shutters that simply stop a beam of light to switches that interchange two or more channels, up to large-scale exchanges that handle thousands of incoming fibers and switch any incoming channel to any outgoing channel. Requirements for these switches vary: some must be fast, others must have minimal insertion loss, and physical size for many should be small enough to be placed on a printed circuit board with corresponding electronic components. A diversity of actuation technologies are being prepared to meet these challenges and the resulting business opportunities.

Microelectromechanical systems (MEMS) actuator technology is now receiving funding of sufficient magnitude that the economies of production by large-scale micromachining will be realized. As manufacturing costs are reduced fiber optics systems will compete with telephone, cable, and wireless communication. As this happens, fiber optics will replace electronics and wires because of the enormous bandwidth advantage, leading to all-optical networking. It is reasonable to anticipate that as costs are reduced fiber optics will travel all the way to the desk-top computer.

One criterion for successful transmission is quality of service. Carriers of internet data must provide nearly un-interrupted service as loads vary, equipment fails or undergoes maintenance, and accidents happen. For this reason IP systems are designed with redundancy and a capability for self-diagnostics and automatic re-routing of traffic.

One type of diagnosis requires interrupting an optical path carrying information traffic so that the background noise can be measured. This invention provides an essential component for diagnostics systems in fiber optics: a miniature, PC-board mountable light shutter.

This invention is intended to fill a specific need for a shutter to temporarily block light. The aperture may be as large as several cm long and 2 mm wide, so the shutter must move a significant distance and cover a large area. The timing varies: a shutter may be closed for as little as a few msec or for as much as 500 msec.

The space available for the mechanism is limited: it must be small enough to be placed on a PC board.

OBJECTS AND SUMMARY OF THE INVENTION

It is a general object of the invention to provide a light shutter that has high reliability, robustness, and a long useful lifetime.

Another object is to provide a light shutter of the type described which is electronically driven and is capable of operating at voltages compatible with transistor transistor logic circuitry.

BRIEF DESCRIPTION OF THE DRAWINGS

FIG. 1 is a schematic drawing showing a light shutter of the invention in broad concept form.

FIG. 2 is a top plan view of a frame for the light shutter of FIG. 1.

FIG. 3 is a side elevation view taken along the line 2—2 of FIG. 2.

FIG. 4 is an end elevation view taken along the line 3—3 of FIG. 3

FIG. 5 is an isometric view of the light shutter frame of FIG. 2.

FIG. 6 is a bottom plan view of the light shutter frame of FIG. 2.

DESCRIPTION OF THE PREFERRED EMBODIMENTS

In the drawings FIGS. 1–6 show a light shutter 10 in accordance with one preferred embodiment comprising a frame 11 to which a bi-stable beam 12 is attached. Beam 12 is compressed along its long axis so that it is buckled up (as in FIG. 1) or down. An occluder 14 (FIG. 1) of a suitable opaque material is attached at the center of the beam. As the beam changes state from buckled up to buckled down (or vice versa) the occluder passes in front of an opening or aperture 16 formed in the frame (FIG. 2). The relative vertical positions of the beam and aperture determine whether the aperture is closed in one state or the other, or is temporarily occluded during passage of the beam from one state to the other. A light signal, such as the light ray 17, is directed into the aperture. The signal is either occluded or passes uninterrupted depending on whether the occluder is either in front of or away from the aperture.

The beam is moved from one state to the other by one of a pair of thin shape-memory alloy ("SMA") actuators 18 and 20. A preferred shape memory alloy for use in forming the actuators is an alloy of nearly equal atomic weights of Titanium and Nickel (TiNi). Each actuator is formed in a "V" shape with its opposite ends attached at respective anchor points 22, 24, 26 and 28 on the frame. The apex of the "V" of each actuator is attached at anchor points 30, 32, respectively, to the beam. The apexes of the actuators are located at approximately one-third of the length of the beam to minimize the force and stroke necessary to effect change of state of the beam. The "V" shape of the actuators provides a force multiplication effect on the beam. This results in a short displacement stroke of each leg of the actuator as it contracts. This produces a relatively larger pulling force on the beam as compared to the force that would be produced by an actuator of the same length pulling in a directional orthogonal with the beam.

Transit time may be adjusted by varying the stiffness of the beam and the mass of the occluder. Motion of the beam is dictated by the spring constant of the beam and the mass of occluder 14. Rapid actuation is achieved by delivering a pulse of high electric current through a selected one of the SMA actuators for a short time sufficient to cause resistance heating of the actuator through its shape-change transition temperature. The shape change comprises length contraction so that the actuator exerts a pulling force on the beam. This force causes the beam to buckle in one direction. When it is desired to cause the beam to buckle in the opposite direction, then with the current path shut off to the first actuator, a pulse of high current is delivered through the opposing actuator, causing it to heat through the transition temperature and thereby contract to exert an opposing pulling force. The time to next cycle value is determined by the rate of cooling of the TiNi actuators. These actuators may be of drawn wire or may be of sputtered thin film: TiNi in thin film form cools more rapidly than wire of round cross section, enabling more rapid cycling.

The buckling beam can be bent upward as shown or pulled downward by the lower SMA wire actuator to a symmetrical position. In doing so it traverses opening 16 and occludes it for a brief interval of time. The two SMA wire actuators thus move the beam from one stable state to another, and each time the beam is moved it blocks light from coming through the opening for 15 msec.

The light shutter of the invention meets the specifications for a shutter that stops light from passing through an opening for a fixed length of time so that 'noise' in 'dark' optic fibers can be measured. The actuator is adaptable for housing in a box-shaped volume 12 mm high, 60 mm long, and 3.5 mm wide.

While the foregoing embodiments are at present considered to be preferred, it is understood that numerous variations and modifications may be made therein by those skilled in the art and it is intended that the invention includes all such variations and modifications that fall within the true spirit and scope of the invention as set forth in the appended claims.

What is claimed is:

1. A light shutter for use in controlling the path of a light signal between occluded and uninterrupted states, the light shutter comprising the combination of a frame, a beam having opposite ends which are mounted on the frame at positions which cause the beam to be compressed along its long axis into either of first or second curved positions at which the beam is in respective first and second bi-stable buckled states, the beam in said first and second positions being enabled to bend, response to a given force transverse to the long axis, out of the respective bi-stable buckled states toward the respective second or first curved positions, an occluder carried on the beam, and an actuator of shape memory alloy which deforms to and from a memory shape responsive to being heated to or cooled below a shape change transition temperature of the alloy, the actuator being connected with the beam to apply the given force to the beam when the alloy deforms to the memory shape, the occluder being moved into and out of the path of the light signal responsive to the beam being in either of the first or second curved positions.

2. A light shutter as in claim 1 in which the actuator comprises a wire having opposite ends anchored to the frame and a midportion which is anchored to the beam.

3. A light shutter as in claim 2 in which the wire is V-shaped.

4. A light shutter as in claim 1 in which the actuator comprises first and second wires of shape memory alloy, each wire having opposite ends anchored to the frame and a midportion, the midportion of the first wire being anchored to the beam at one location which is sufficient to cause the beam to move to the first curved position responsive to the first wire being deformed to its memory shape, and the midportion of the second wire being anchored to the beam at an other location which is sufficient to cause the beam to move to the second curved position responsive to the second wire being deformed to its memory shape.

* * * * *